United States Patent
Nybakken

(10) Patent No.: US 7,506,561 B2
(45) Date of Patent: Mar. 24, 2009

(54) STEERING DEVICE IN AN IMPLEMENT CARRIER

(75) Inventor: Johannes Nybakken, Brumunddal (NO)

(73) Assignee: GGP. Sweden AB, Tranas (SE)

( * ) Notice: Subject to any disclaimer, the term of this patent is extended or adjusted under 35 U.S.C. 154(b) by 406 days.

(21) Appl. No.: 10/552,735

(22) PCT Filed: Feb. 23, 2004

(86) PCT No.: PCT/SE2004/000239

§ 371 (c)(1),
(2), (4) Date: Jul. 21, 2006

(87) PCT Pub. No.: WO2004/096622

PCT Pub. Date: Nov. 11, 2004

(65) Prior Publication Data

US 2006/0266149 A1    Nov. 30, 2006

(30) Foreign Application Priority Data

Apr. 11, 2003 (SE) .................................... 0301072

(51) Int. Cl.
*B62D 1/18* (2006.01)
(52) U.S. Cl. ........................................ 74/493; 280/771
(58) Field of Classification Search .................... 74/492, 74/493; 280/771, 774, 98
See application file for complete search history.

(56) References Cited

U.S. PATENT DOCUMENTS 4,023,434 A    5/1977 Axelsson (Continued)

FOREIGN PATENT DOCUMENTS

GB    807207    1/1959

(Continued)

OTHER PUBLICATIONS

International Search Report.

*Primary Examiner*—David M Fenstermacher
(74) *Attorney, Agent, or Firm*—Harness, Dickey & Pierce, P.L.C.

(57) ABSTRACT

A device for steering a wheel assembly (3, 4, 5*b*) in an implement carrier (1) has a steering wheel (8) non-rotatably connected to a rotatable steering column and a transmission cable which is flexible in the plane of the steering wheel and extends over the steering wheel and forms, on both sides thereof, a cable run (11*a*, 11*b*). Two deflecting wheels (14*a*, 14*b*) arranged on both sides of the steering wheel (8) are located in a second and a third plane angled relative to the plane of the steering wheel. Two flexible steering cables (12, 15*a*, 12*b*, 15*b*), which at one end are connected to the respective cable runs (11*a*, 11*b*), extend over the respective deflecting wheels (14*a*, 14*b*) and at the other end are connected to the wheel assembly (3, 4, 5*b*). The steering cables (12*a*, 15*a*, 12*b*, 15*b*) are connected to the respective cable runs (11*a*, 11*b*) by means of a coupling element (13*a*, 13*b*) consisting of a second deflecting wheel (20*a*, 20*b*) over which the cable run extends about 180°, and a deflecting wheel holder (21*a*, 21*b*) which supports this deflecting wheel (20*a*, 20*b*) rotatably about an axis, perpendicular to the plane of said steering wheel, and to which the steering cable (12*a*, 15*a*, 12*b*, 15*b*) is connected. The cable run (11*a*, 1*b*) is fixed at its end.

7 Claims, 8 Drawing Sheets

U.S. PATENT DOCUMENTS

| | | | |
|---|---|---|---|
| 5,957,497 A * | 9/1999 | Johansson et al. | 280/771 |
| 6,116,371 A * | 9/2000 | Suyama et al. | 180/444 |
| 6,131,380 A | 10/2000 | Browning | |
| 6,450,867 B1 * | 9/2002 | Legatt | 451/350 |

FOREIGN PATENT DOCUMENTS

| | | |
|---|---|---|
| WO | WO 95/31891 | 11/1995 |

* cited by examiner

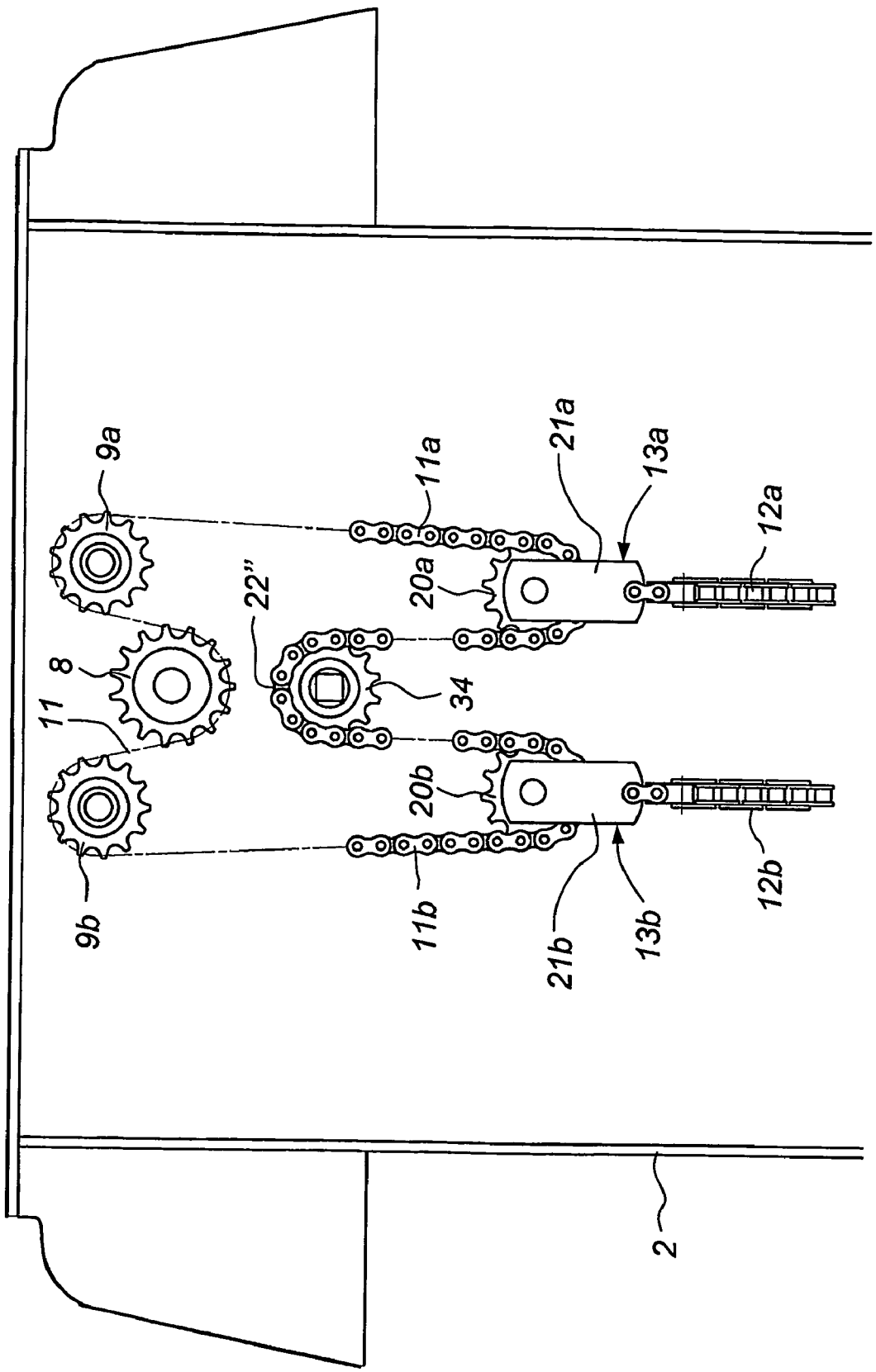

STEERING DEVICE IN AN IMPLEMENT CARRIER

FIELD OF THE INVENTION

The present invention relates to a steering device in an implement carrier, such as a riding mower, having a wheel assembly which is pivotable by means of the steering device, said steering device comprising a rotatable steering column, a steering wheel nonrotatably connected to said steering column, a transmission cable which is flexible in the plane of said steering wheel and which extends over said steering wheel and, on one side of said steering wheel, forms a first cable run and, on the other side of said steering wheel, forms a second cable run, two deflecting wheels which are arranged on both sides of said steering wheel and located in a second and a third plane, respectively, each of which is angled relative to the plane of said steering wheel, and two flexible steering cables which at one end are connected to the respective cable runs, extend over the respective deflecting wheels and at the other end are connected to the wheel assembly.

BACKGROUND ART

In a prior art steering device in a riding mower, use is made of a steering wire which is wound around a rotatable steering column and extends over two first deflecting wheels arranged on both sides of the steering column and located in a common plane, and two second deflecting wheels arranged on both sides of the steering column and located in a second and a third plane, respectively, which is substantially orthogonal relative to this common plane, to a steerable wheel assembly, to which it is connected. This steering device suffers from the essential drawback that the steering wire is rapidly worn especially in the portion thereof extending over the steering column, but also in the portions extending over the first and the second deflecting wheels. This results in a frequent breaking of the steering wire, thus necessitating replacement.

In order to reduce this drawback, that part of the steering wire which extends over the steering column and the two first deflecting wheels has been replaced in a known steering device, which is of the type described by way of introduction, with a transmission chain extending over a steering sprocket nonrotatably connected to the steering column and located in the same plane as the first two deflecting wheels which here consist of sprockets. This chain is, at each end, connected to a steering wire which like before extends over the respective second deflecting wheels to the steerable wheel assembly. In this prior art steering device, the wear in the area of the steering column is eliminated. The wear problem, however, remains for the steering wires which extend over the second two deflecting wheels and which therefore break relatively frequently.

In order to eliminate this wear problem too, each of the flexible steering cables in a steering device, known from WO 95/31891, has been formed as a transmission chain which is, between the steering sprocket and the respective deflecting wheels, coupled, by means of a link element, to the chain, flexible in the plane of the steering sprocket, so as to form a straight line with said chain, the link element having a first hinge pin to which an end link in one of these two chains is articulated, and a second hinge pin to which an end link in the other of these two chains is articulated, said two hinge pins being angled relative to each other at an angle equalling the angle, preferably 90°, at which the second and the third plane, respectively, is angled relative to the plane of the steering sprocket.

Regardless of the transmission cable and the steering cables being steering wires or transmission chains, the force, which, in these known steering devices, with the aid of a hand wheel has to be applied to the steering column to make it pivot the wheel assembly, is very large, making it rather difficult to operate the implement carrier.

SUMMARY OF THE INVENTION

An object of the present invention is to provide a steering device which considerably reduces the force needed to pivot the wheel assembly.

This object is achieved by means of a steering device which is of the type mentioned by way of introduction and characterised in that the flexible steering cables are connected to the respective cable runs by means of a coupling element consisting of a second deflecting wheel over which the cable run extends about 180°, and a deflecting wheel holder which supports this deflecting wheel rotatably about an axis, perpendicular to the plane of said steering wheel, and to which the steering cable is connected, the cable run being fixed at its end.

The deflecting wheel holder preferably is a substantially U-shaped yoke, the two legs of which are parallel to the plane of the steering wheel and the web portion of which is connected to the respective steering cable.

In a preferred embodiment, the steering wheel is a sprocket, the transmission cable is a transmission chain and the deflecting wheel of the coupling element is a sprocket.

Each of the two steering cables preferably consists of a transmission chain.

In a preferred modification of the last mentioned embodiment, the two steering cables between the respective deflecting wheels and the wheel assembly are located in a common plane which is angled relative to the second and the third plane, the steering device comprising a steering pulley which is included in said wheel assembly and which is located in this common plane and to which the steering cables are connected, each of the chains forming the steering cables consists of two partial chains which between the respective deflecting wheels and the steering pulley are coupled together by means of a link element, so as to form a straight line with each other, said link element having a first hinge pin to which an end link of one partial chain is articulated, and a second hinge pin to which an end link of the other partial chain is articulated, said two hinge pins being turned around said straight line relative to each other at an angle equalling the angle at which said common plane is angled relative to the second and the third plane, respectively.

Said common plane preferably is a horizontal plane and said second and said third planes preferably are vertical planes.

Said second plane as well as said third plane preferably are angled 90° relative to the plane of said steering wheel.

BRIEF DESCRIPTION OF THE DRAWINGS

The invention will now be described in more detail with reference to the accompanying drawings.

FIG. 9 is a view corresponding to FIG. 5 but showing a steering device according to a third embodiment of the invention.

DESCRIPTION OF PREFERRED EMBODIMENTS

Figure 1:
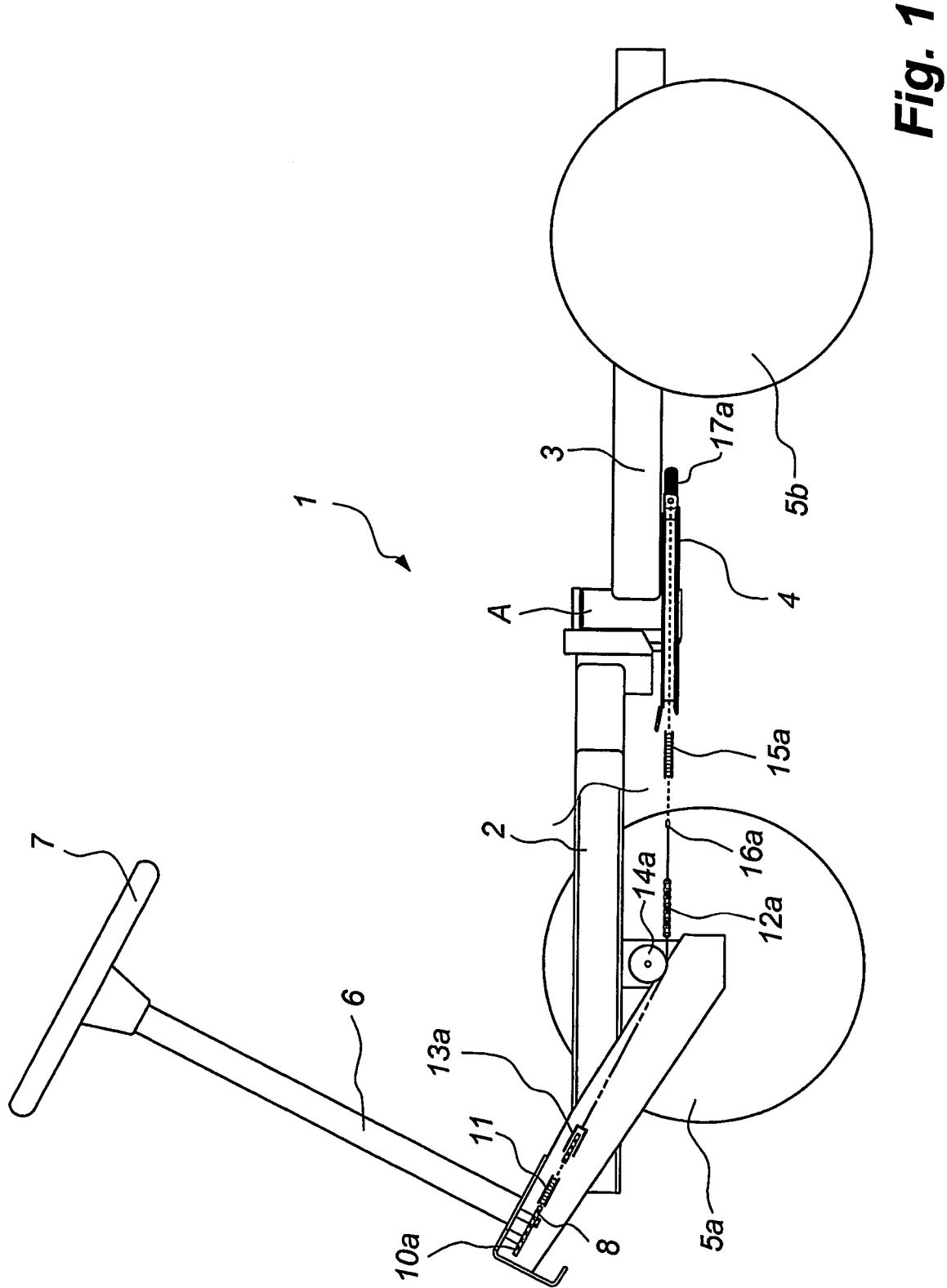
FIG. 1 is a schematic side view and illustrates an implement carrier provided with a steering device according to a first embodiment of the invention.

The implement carrier 1 schematically shown in FIG. 1 is a riding mower. The riding mower is articulated and has a front frame 2 and a rear frame 3 which are pivotally connected to each other about a vertical pivot axis A. The front frame 2 supports the front wheels 5a of the riding mower. The rear frame 3 supports the rear wheels 5b of the riding mower 1 and is included in a wheel assembly which is pivotable relative to the front frame 2. A steering pulley 4, which is fixedly connected to the rear frame 3 and whose centre axis coincides with the pivot axis A, is also included in the wheel assembly. The steering pulley 4 has two guiding grooves which are arranged in two diametrically opposed portions of the circumference of the pulley.

The steering device of the riding mower 1 has a steering column 6 which is rotatably mounted in the front frame 2. The steering column 6 makes an angle of about 30° with the vertical plane and has, at its upper end, a hand wheel 7 for rotating the steering column 6. A steering sprocket 8 is non-rotatably connected to the steering column 6 at the lower end thereof. Four deflecting sprockets 9a, 9b, 10a and 10b are arranged in pairs on both sides of the steering sprocket 8 and located in the same plane as this, i.e. in a plane which is inclined about 30° relative to the horizontal plane.

A roller chain 11, which is flexible in the plane of the sprockets, extends over the steering sprocket 8 and the deflecting sprockets 9a, 9b, 10a and 10b. The roller chain 11 forms, on one side of the steering sprocket 8, a first chain run 11a, which extends backwards from the left-hand outer deflecting sprocket 10a, seen in the direction of forward travelling of the riding mower 1, and forms, on the other side of the steering sprocket 8, a second chain run 11b, which extends backwards from the right-hand outer deflecting sprocket 10b.

The chain runs 11a and 11b are connected to one end of a roller chain 12a and 12b, respectively. Each chain run 11a and 11b and its roller chain 12a and 12b are coupled together by means of a coupling element 13a and 13b, respectively, described in more detail below. The roller chains 12a and 12b are flexible in the vertical direction and extend backwards over the respective deflecting sprockets 14a and 14b, in front of which they are located in the above-mentioned plane inclined about 30°, and behind which they are located in a common horizontal plane. The deflecting sprockets 14a and 14b have horizontal centre axes. The roller chains 12a and 12b are, at their other end, connected to one end of a roller chain 15a and 15b, respectively. The roller chains 12a and 15a as well as 12b and 15b are coupled together by means of a link element 16a and 16b, respectively, described in more detail below, in such a manner that that part of the roller chain 12a and 12b, respectively, which is positioned behind the respective deflecting sprockets 14a and 14b, and the roller chain 15a and 15b, respectively, extend in a straight line with each other. The roller chains 15a and 15b, which are thus located in said common horizontal plane, are flexible in the horizontal direction and each extend into one of the grooves at the circumference of the steering pulley 4. In a known manner, the roller chains 15a and 15b are, at their rear end, connected to the steering pulley 4 via a spring mechanism 17a and 17b, respectively, the point of attachment 18b of the roller chain 15b being located closer to the centre of the steering pulley 4 than the point of attachment 18a of the roller chain 15a. The spring mechanisms 17a and 17b serve to prevent the hand wheel from stopping unresiliently when maximally turned in one or the other direction. The roller chain 15b extends to its point of attachment 18b via a sprocket 19 arranged on the underside of the steering pulley 4.

Figure 5:
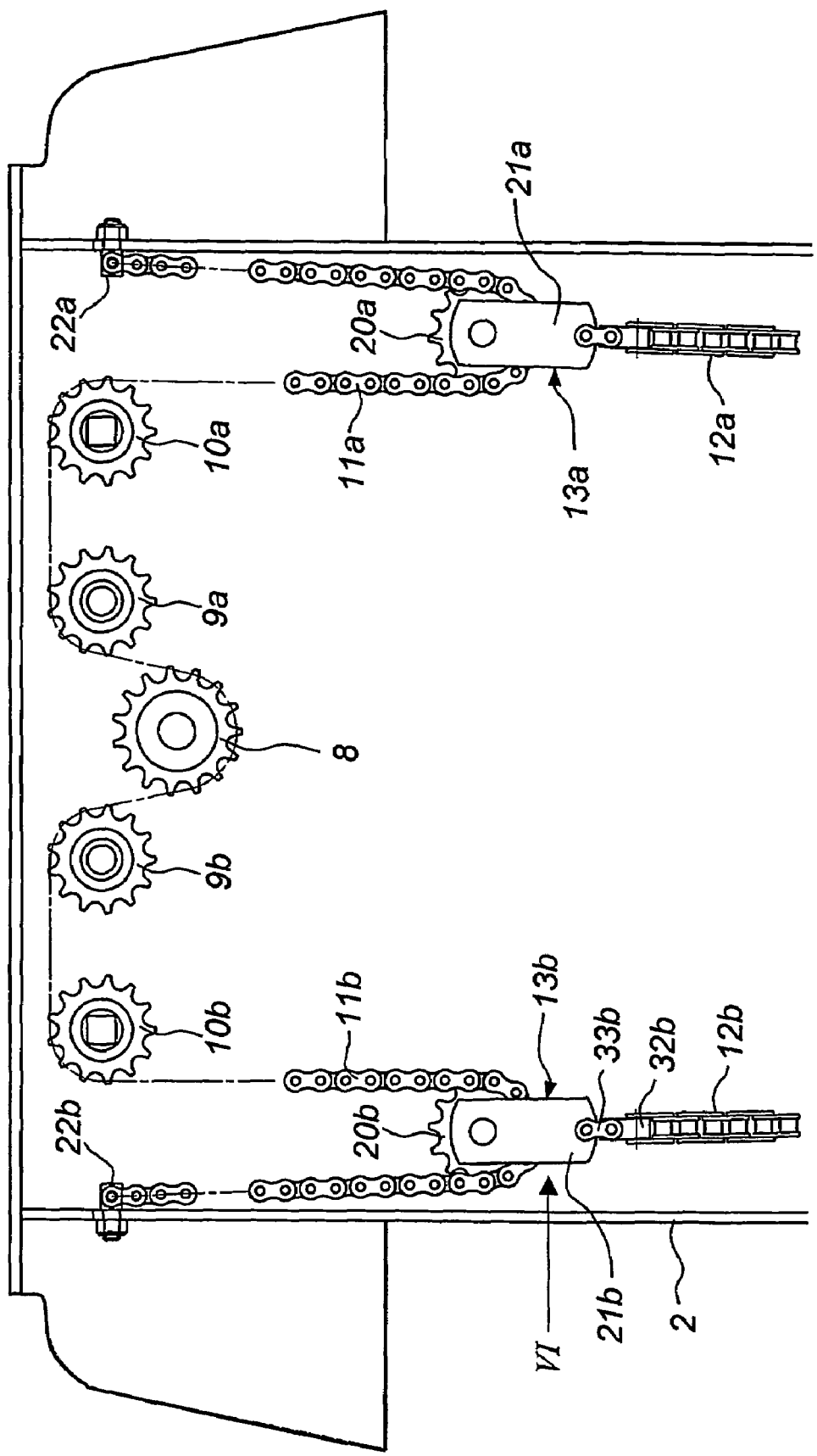
FIG. 5 shows a portion of FIG. 2 in a larger scale.
Figure 6:
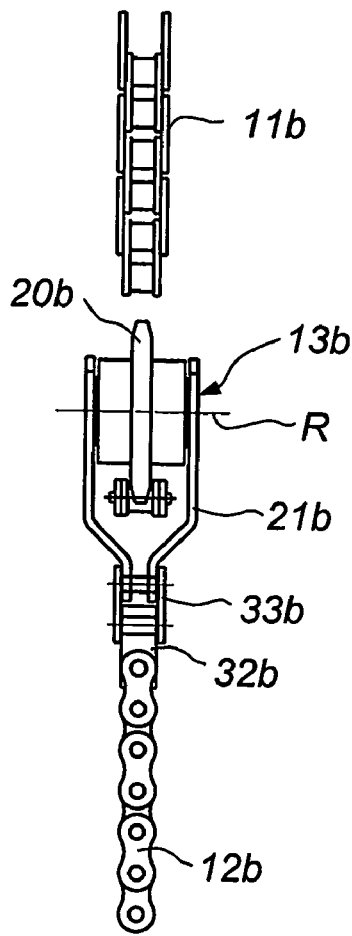
FIG. 6 shows a portion of FIG. 5 in the direction of arrow VI in FIG. 5.

As described above, the roller chains 12a and 12b are at one end coupled to the chain run 11a and 11b, respectively, by means of a coupling element 13a and 13b, respectively. The two coupling elements 13a and 13b are identical and are described in more detail below with reference to FIGS. 5 and 6. Each coupling element 13a, 13b consists of a deflecting sprocket 20a, 20b over which the chain run 11a, 11b extends about 180°, and a deflecting wheel holder 21a, 21b which supports the deflecting sprocket 20a, 20b rotatably about a rotational axis R, perpendicular to the plane of the steering sprocket, and to which the roller chain 12a, 12b is connected. The deflecting wheel holder 21a, 21b is a substantially U-shaped yoke, the two legs of which are parallel to the plane of the steering sprocket (see FIG. 1) and the web portion of which is connected to the roller chain 12a, 12b in a way which is described in more detail below.

The free end of each cable run 11a and 11b is fixed to the front frame 2 by means of a fastening bolt 22a and 22b, respectively.

Figure 7:
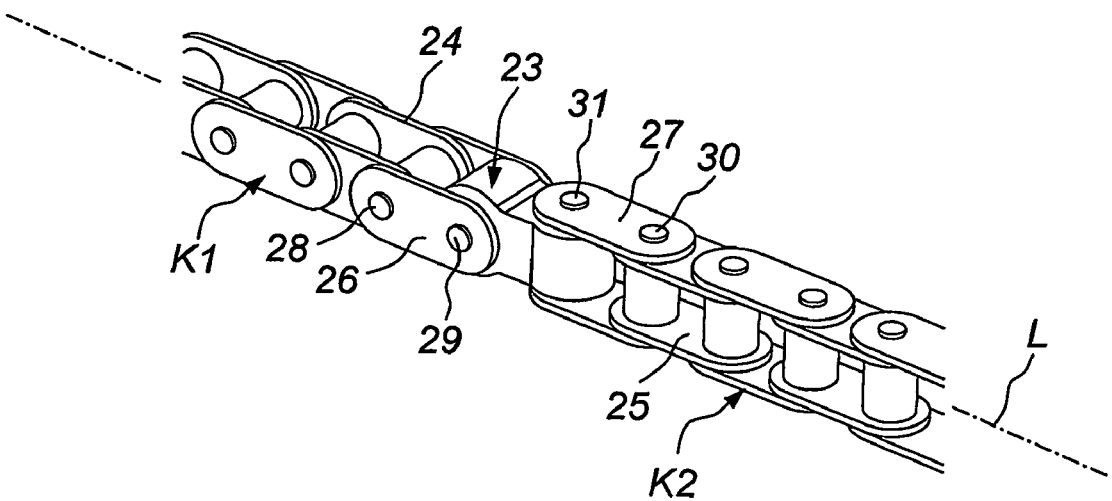
FIG. 7 is a perspective view of a link element for coupling two chains together.

FIG. 7 illustrates a link element 23 which can be used for coupling the roller chains 12a and 12b to the roller chain 15a and 15b, respectively, i.e. as link element 16a and 16b, respectively.

The link element 23 is intended for coupling together two roller chains K1 (e.g. the roller chain 12a or 12b) and K2 (e.g. the roller chain 15a or 15b), which are turned 90° relative to each other, in a straight line with each other. In FIG. 7, this line is designated L. The link element 23 is substantially in the shape of a bar which has two transverse through holes extending perpendicularly to each other, and is adapted to be placed between the end inner links 24 and 25 of the roller chains K1 and K2 and to be connected to the inner links by means of two conventional chain locks 26 and 27, each having two parallel bolts 28, 29 and 30, 31, respectively. One bolt 28 of one chain lock 26 is inserted into the end sleeve of one inner link 24, and its other bolt 29 is inserted into one hole of the bar. One bolt 30 of the other chain lock 27 is inserted into the end sleeve of the other inner link 25, and its other bolt 31 is inserted into the other hole of the bar.

Each roller chain 12a and 12b is connected to the deflecting wheel holder 21a and 21b, respectively, by means of a link element 32a, 32b of the type described above with reference to FIG. 7. The link elements 32a, 32b are connected to the respective roller chain 12a, 12b in the way described above, and are connected to the respective deflecting wheel holder 21a, 21b by means of a conventional chain lock 32a, 32b with two parallel bolts, one of which extends through the respective link element 32a, 32b, and the other of which extends through the web portion of the respective deflecting wheel holder 21a, 21b (see FIGS. 5 and 6).

Figure 2:
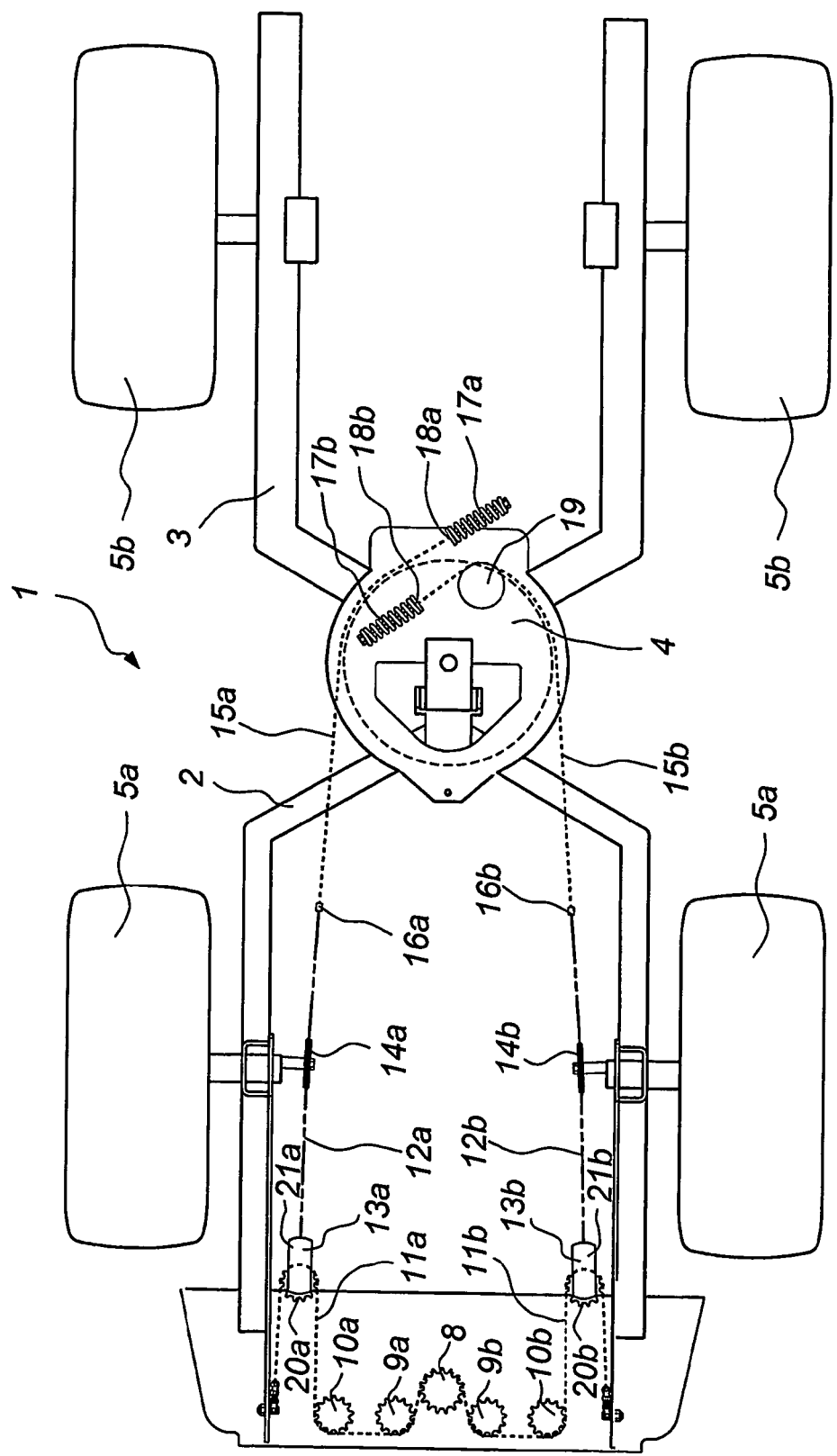
FIGS. 2-4 illustrate the implement carrier in FIG. 1 from below, the steering device being shown in a starting position, a first end position and a second end position.
Figure 3:
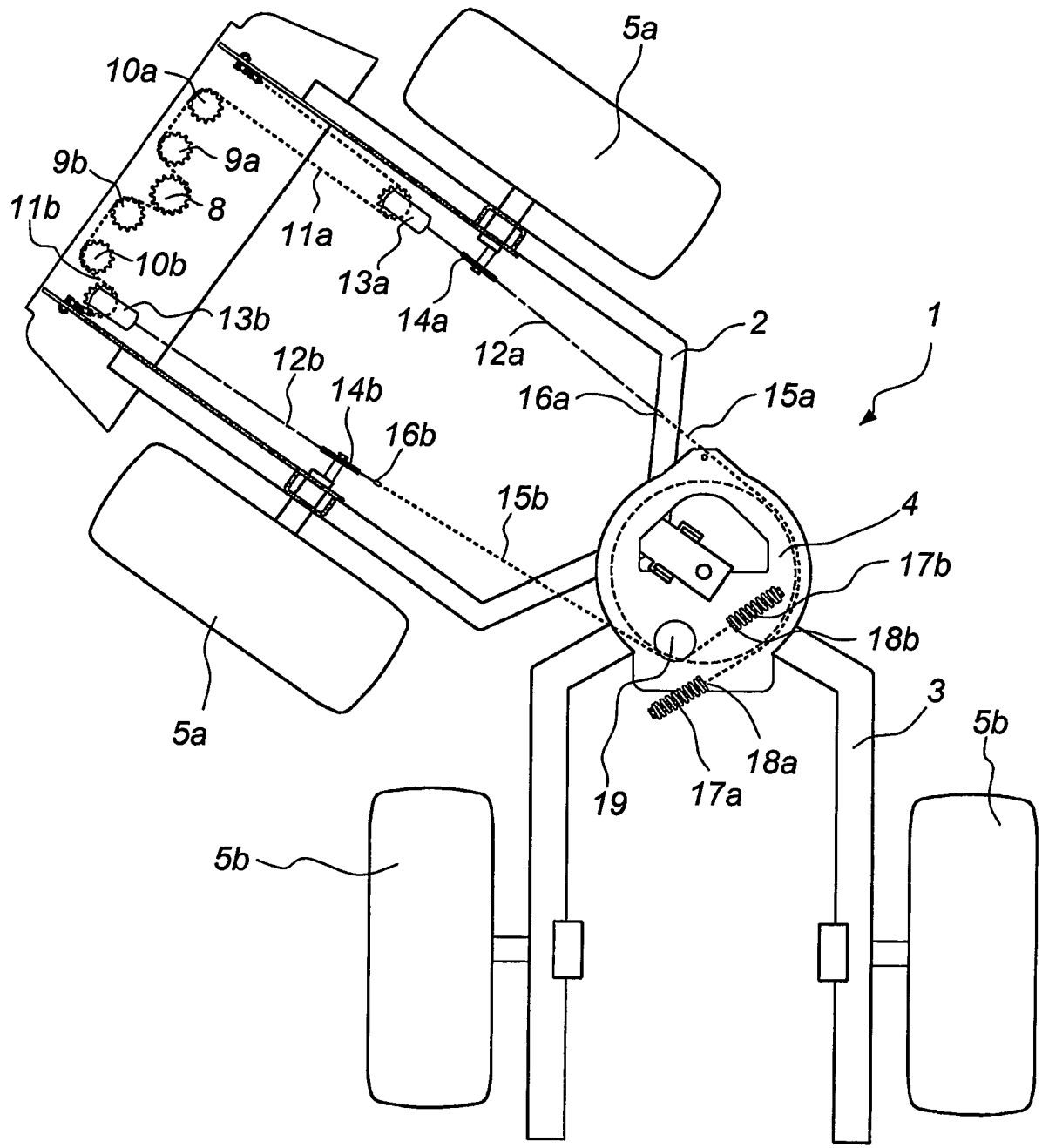
Figure 4:
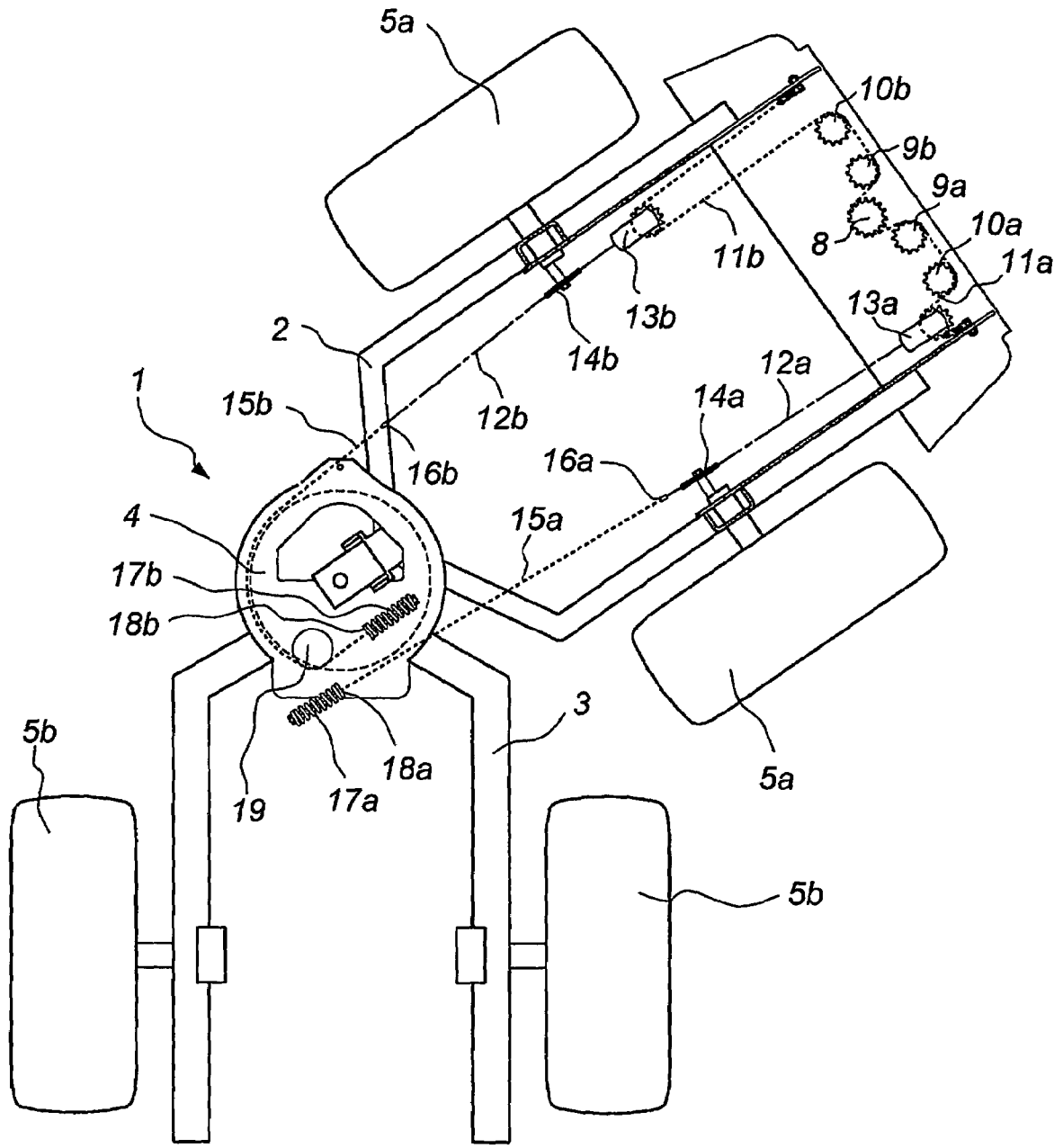

When turning the hand wheel 7 in one direction (clockwise as seen by the driver) from the starting position of the steering device, which is shown in FIG. 2 and in which the riding mower 1 is driven straight ahead, the wheel assembly 3, 4, 5b is pivoted in the direction of the end position shown in FIG. 3, whereby the riding mower 1 turns to the right, and when turning the hand wheel 7 in the opposite direction (anticlockwise as seen by the driver) from the starting position, the wheel assembly 3, 4, 5b is pivoted in the direction of the end position shown in FIG. 4, whereby the riding mower 1 turns to the left.

As appears from FIGS. 2-4, the two link elements 16a and 16b are, in each pivoting position of the wheel assembly 3, 4, 5b, positioned between the deflecting sprocket 14a and 14b, respectively, and the steering pulley 4.

By the fact that the two chain runs 11a and 11b, instead of being, at one end thereof, directly connected to the roller chain 12a and 12b, respectively, as in the prior art constructions, are connected here to the roller chain 12a and 12b, respectively, via the coupling element 13a and 13b, respectively, extend over the deflecting sprocket 20a and 20b, respectively, and, at the free end thereof, are fixed to the frame 2, the degree of turning of the hand wheel needed to provide a given pivoting of the wheel assembly 3, 4, 5b relative to the frame 2 will increase, but, on the other hand, the force needed to pivot the wheel assembly 3, 4, 5b will be reduced in a corresponding extent.

Figure 8:
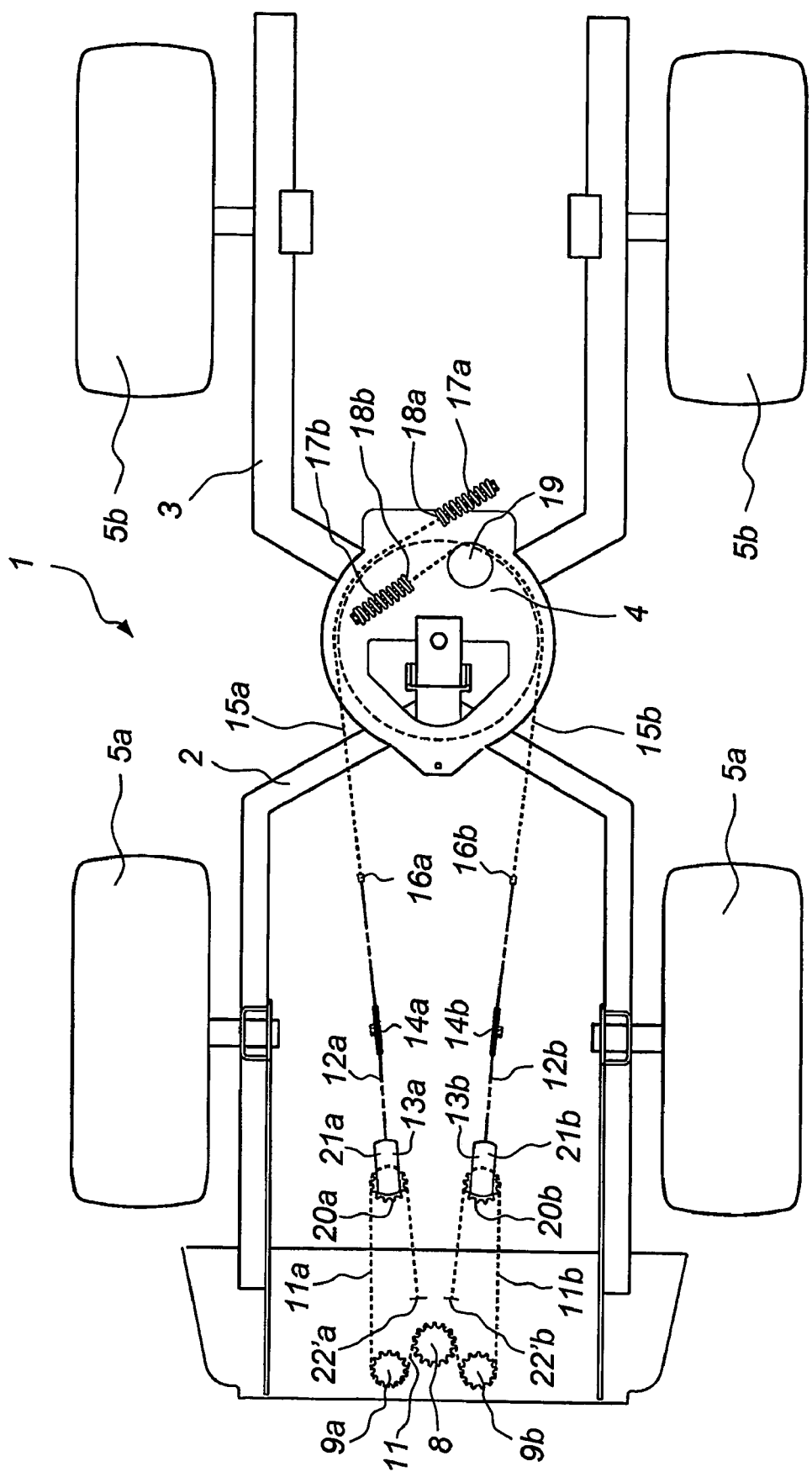
FIG. 8 is a view corresponding to FIG. 2 but illustrating an implement carrier provided with a steering device according to a second embodiment of the invention.

The second embodiment shown in FIG. 8 differs from the first embodiment described above only in that the two outer deflecting sprockets (10a, 10b) have been removed and in that the chain runs 11a, 11b extend about 180° over the deflecting sprockets 20a, 20b of the coupling elements 13a, 13b inwardly from outside, seen in the cross direction of the implement carrier 1, instead of outwardly from inside, which is the case in the first embodiment. In the second embodiment, each chain run 11a, 11b, just as in the first embodiment, is fixed at its free end, which is fixedly connected to the front frame 2 at 22'a, 22'b in a way not shown in detail in FIG. 8.

The third embodiment shown in FIG. 9 differs from the second embodiment shown in FIG. 8 only in that the flexible roller chain 11 is not an open ended chain but an endless chain, which means that the "free" ends of the chain runs 11a, 11b are connected to each other at a point 22'', where the roller chain 11 is fixed. The two chain runs 11a and 11b extend backwards from the deflecting sprocket 9a and 9b, respectively, about 180° over the deflecting sprocket 20a and 20b, respectively, and about 90° over a deflecting sprocket 34, which is nonrotatably connected to the front frame 2, to the point 22'' of connection. Of course, the nonrotatable sprocket 34 may be replaced by any other means fixing the point 22'' of connection.

Other transmission chains than roller chains, e.g. sleeve-type chains, can be used in the steering device according to the invention. Further, wires can be used instead of chains.

The invention claimed is:

1. A steering device in an implement carrier, such as a riding mower, having a wheel assembly which is pivotable by means of the steering device, said steering device comprising a rotatable steering column, a steering wheel nonrotatably connected to said steering column, a transmission cable which is flexible in the plane of said steering wheel and which extends over said steering wheel and, on one side of said steering wheel, forms a first cable run and, on the other side of said steering wheel, forms a second cable run, two deflecting wheels which are arranged on both sides of said steering wheel and located in a second and a third plane, respectively, each of which is angled relative to the plane of said steering wheel, and two flexible steering cables which at one end are connected to the respective cable runs, extend over the respective deflecting wheels and at the other end are connected to the wheel assembly, wherein the flexible steering cables are connected to the respective cable runs by means of a coupling element consisting of a second deflecting wheel over which the cable run extends about 180°, and a deflecting wheel holder which supports this deflecting wheel rotatably about an axis, perpendicular to the plane of said steering wheel, and to which the steering cable is connected, the cable run being fixed at its end.

2. A steering device as claimed in claim 1, in which the deflecting wheel holder is a substantially U-shaped yoke, the two legs of which are parallel to the plane of the steering wheel and the web portion of which is connected to the respective steering cable.

3. A steering device as claimed in claim 1, in which the steering wheel is a sprocket, the transmission cable is a transmission chain and the deflecting wheel of the coupling element is a sprocket.

4. A steering device as claimed in claim 1, in which each of the two steering cables consists of a transmission chain.

5. A steering device as claimed in claim 4, in which the two steering cables between the respective deflecting wheels and the wheel assembly are located in a common plane which is angled relative to the second and the third plane, the steering device comprising a steering pulley which is included in said wheel assembly and which is located in this common plane and to which the steering cables are connected, each of the chains forming the steering cables consists of two partial chains which between the respect five deflecting wheels and the steering pulley are coupled together by means of a link element, so as to form a straight line with each other, said link element having a first hinge pin to which an end link of one partial chain is articulated, and a second hinge pin to which an end link of the other partial chain is articulated, said two hinge pins being turned around said straight line relative to each other at an angle equalling the angle at which said common plane is angled relative to the second and the third plane, respectively.

6. A steering device as claimed in claim 5, in which said common plane is a horizontal plane and said second and said third planes are vertical planes.

7. A steering device as claimed in claim 1, in which said second plane as well as said third plane are angled 90° relative to the plane of said steering wheel.

* * * * *